Aug. 15, 1933.                    F. L. SCOTT                    1,922,400

RETAINING MEANS FOR SHAFTS AND THE LIKE

Filed May 8, 1930

Floyd L. Scott  Inventor

By  Jesse R. Stone

Attorney

Patented Aug. 15, 1933

1,922,400

UNITED STATES PATENT OFFICE 1,922,400

RETAINING MEANS FOR SHAFTS AND THE LIKE

Floyd L. Scott, Houston, Tex.

Application May 8, 1930. Serial No. 450,645

2 Claims. (Cl. 287—20)

My invention relates to means to secure shafts, pins, rods and similar mechanical parts in position relative to the tool or machine on which they are used.

It is an object of the invention to provide a retaining device to be employed in metal structures to secure the smaller parts such as pins or shafts firmly in position, such device being capable of quick removal.

I desire to form a retaining device of the character stated which is simple in structure, easily inserted or removed, and economical to make and use.

Referring to the drawing herewith, I have illustrated the invention as applied to a reamer shaft on earth boring drills.

In Fig. 1 is shown a broken side elevation of a reamer with the invention thereon.

Figure 1:
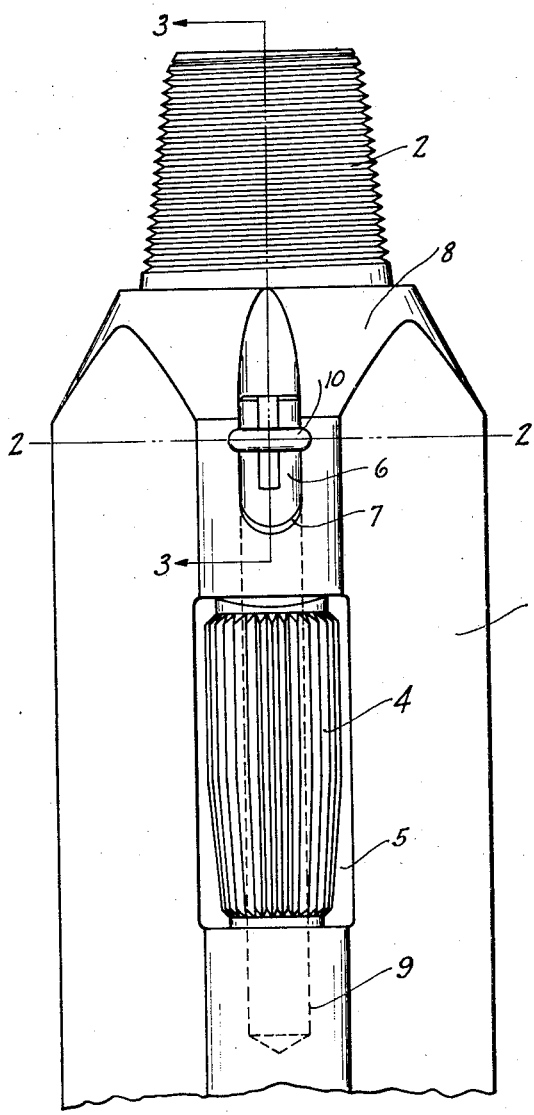
Figure 2:
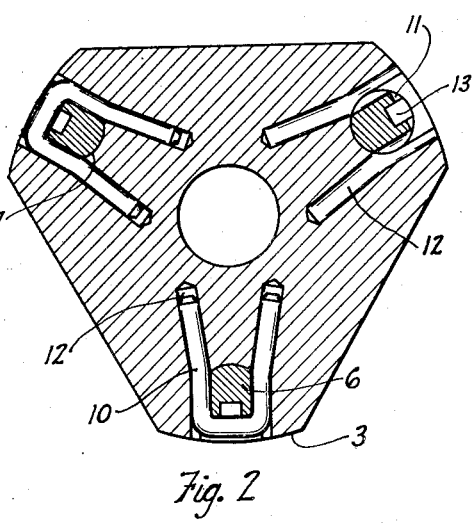
Fig. 2 is a transverse section on the plane 2—2 of Fig. 1.

The reamer on which my device is shown comprises a head 1, having a reduced upper threaded shank 2 for engagement with a drill collar. The head is approximately triangular in cross section as seen in Fig. 2. The rounded corners 3 furnish a support for the reaming rollers 4.

The rollers 4 are mounted in recesses 5 in the head. The rollers shown are toothed and are cylindrical at their upper ends, the lower portions being tapered downwardly.

Said rollers are mounted to rotate upon shafts 6 which are inserted through an opening 7 in the upper shoulder 8 of the head. Said shaft passes through the cutter and fits within a recess or socket 9 in the lower end of the recess 5 in which the roller rotates.

The shaft 6 is retained in position by means of a staple 10 which is normally U-shaped. The shaft 6 is formed with a half round groove 11 on one side to receive the staple, and two opposite sides of the shaft are formed with parallel grooves to receive the legs of the said staple, which are cylindrical in shape.

The head 1 is formed with bores or recesses 12 which are parallel for a short distance and then diverge, as seen in Fig. 2, so that when the staples are driven therein, the legs are forced apart and bent so as to resiliently engage the sides of the bores 12 and thus be held frictionally against removal.

Figure 3:
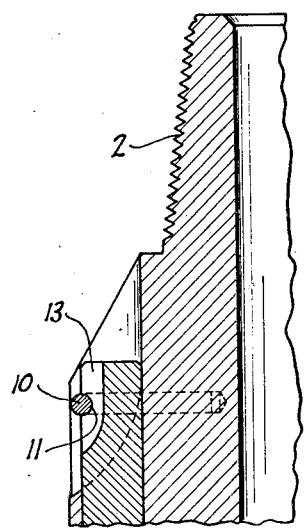
Fig. 3 is a broken section on the plane 3—3 of Fig. 1.

It will be noted that the shafts 6 are held nonrotatably in position by the engagement thereby of the parallel portions of the staple. To remove the staple, the outer side of the shaft at its upper end is grooved at 13. Said groove is inclined outwardly at the lower end as seen in Fig. 3, so that when a drift pin is driven into said groove behind the staple, the said staple may be quickly pulled outwardly from the head.

My staple has the advantage that it can be used in combination with recesses formed in the tool to bend the legs and thus make a rigid retaining device, which not only prevents removal of the shaft but also prevents its rotation. Also the device may be quickly removed without the use of wrench or screw-driver in a minimum of time.

While I have illustrated the device in combination with a reamer, it is to be understood that its use is not confined to the device shown.

What I claim as new is:

1. A metal body, a shaft supported in said body, in combination with means to retain said shaft in said body including a staple of resilient metal the head of which is adapted to engage about said shaft, said body having bores to receive the legs of said staple, said bores being straight adjacent said shaft to fit about the same and diverging inwardly therefrom to frictionally receive said legs.

2. A body of hard metal, a cylindrical bearing shaft supported therein, a U-shaped shaft holding staple, said shaft having one end grooved by two opposite straight grooves and a connecting groove at right angles thereto, the staple engaging said grooves to hold said shaft rigidly in place, the two legs of said staple beyond the shaft being frictionally held in diverging bores in the said body.

FLOYD L. SCOTT.